(12) United States Patent
Witt et al.

(10) Patent No.: US 11,189,319 B2
(45) Date of Patent: Nov. 30, 2021

(54) COMPUTER-IMPLEMENTED METHOD AND SYSTEM OF AUGMENTING A VIDEO STREAM OF AN ENVIRONMENT

(71) Applicant: Ubimax GmbH, Bremen (DE)

(72) Inventors: Hendrik Witt, Bremen (DE); Falko Schmid, Bremen (DE)

(73) Assignee: TEAMVIEWER GMBH, Göppingen (DE)

( * ) Notice: Subject to any disclaimer, the term of this patent is extended or adjusted under 35 U.S.C. 154(b) by 0 days.

(21) Appl. No.: 16/775,482

(22) Filed: Jan. 29, 2020

(65) Prior Publication Data
US 2020/0243115 A1 Jul. 30, 2020

(30) Foreign Application Priority Data
Jan. 30, 2019 (EP) .................................... 19154514

(51) Int. Cl.
*H04N 9/80* (2006.01)
*G11B 27/031* (2006.01)
*G06T 7/579* (2017.01)
*G06T 7/593* (2017.01)
(Continued)

(52) U.S. Cl.
CPC ........ *G11B 27/031* (2013.01); *G06F 21/6245* (2013.01); *G06T 7/579* (2017.01); *G06T 7/593* (2017.01); *G11B 27/3081* (2013.01); *G06T 2207/10012* (2013.01); *G06T 2207/10016* (2013.01); *G06T 2207/10028* (2013.01)

(58) Field of Classification Search
USPC ...................................................... 386/241
See application file for complete search history.

(56) References Cited

U.S. PATENT DOCUMENTS

| 8,928,680 B1* | 1/2015 | Sanketi | ..................... G06T 1/60 345/543 |
| 2006/0268101 A1* | 11/2006 | He | ........................ H04N 7/147 348/14.12 |
| 2009/0207269 A1 | 8/2009 | Yoda | |

(Continued)

FOREIGN PATENT DOCUMENTS

WO 2017139282 A1 8/2017

OTHER PUBLICATIONS

European Search Report received in Application Serial No. 19154514.4-1208, dated Mar. 19, 2019, 8 pages.

*Primary Examiner* — Nigar Chowdhury
(74) *Attorney, Agent, or Firm* — Arc IP Law, PC; Joseph J. Mayo

(57) ABSTRACT

In a computer-implemented method and system of augmenting a video stream of an environment, a processing device receives a first video stream including a plurality of image frames provided from at least one camera, processes the plurality of image frames of the first video stream to define a spatial scope of image data within a respective one of the image frames, modifies the plurality of image frames with frame-based modification information configured to obfuscate or delete or restrict at least one portion of a respective one of the image frames which is outside of the spatial scope of image data within the respective one of the image frames, and outputs a second video stream based on the modified plurality of image frames with the frame-based modification information for transmission to a receiving device, such as a display device.

14 Claims, 5 Drawing Sheets

(51) Int. Cl.
*G06F 21/62* (2013.01)
*G11B 27/30* (2006.01)

(56) References Cited

U.S. PATENT DOCUMENTS

| | | | | |
|---|---|---|---|---|
| 2009/0251460 | A1* | 10/2009 | Dunnigan | G06T 15/50 345/419 |
| 2010/0119175 | A1* | 5/2010 | Tsang | H04N 19/597 382/294 |
| 2010/0195716 | A1* | 8/2010 | Klein Gunnewiek | H04N 19/597 375/240.08 |
| 2011/0181588 | A1* | 7/2011 | Barenbrug | G06T 15/205 345/419 |
| 2012/0182403 | A1* | 7/2012 | Lange | H04N 13/363 348/51 |
| 2012/0188234 | A1* | 7/2012 | Ortega | G06T 15/20 345/419 |
| 2012/0224019 | A1* | 9/2012 | Samadani | H04N 9/09 348/14.01 |
| 2013/0064465 | A1* | 3/2013 | Tin | G06T 5/50 382/248 |
| 2013/0069933 | A1* | 3/2013 | Smithwick | G02B 30/27 345/419 |
| 2013/0194255 | A1* | 8/2013 | Lee | H04N 13/128 345/419 |
| 2013/0222246 | A1* | 8/2013 | Booms | G06F 3/0484 345/168 |
| 2014/0002596 | A1* | 1/2014 | Antonio | H04N 19/86 348/43 |
| 2014/0176663 | A1 | 6/2014 | Cutler et al. | |
| 2014/0198838 | A1* | 7/2014 | Andrysco | H04N 19/12 375/240.1 |
| 2014/0201666 | A1* | 7/2014 | Bedikian | G06F 3/04815 715/771 |
| 2014/0269944 | A1* | 9/2014 | Isnardi | H04N 19/115 375/240.29 |
| 2014/0362163 | A1 | 12/2014 | Winterstein et al. | |
| 2014/0376635 | A1* | 12/2014 | Senoh | H04N 13/161 375/240.16 |
| 2015/0009124 | A1* | 1/2015 | Antoniac | G06K 9/00389 345/156 |
| 2015/0241712 | A1* | 8/2015 | Smithwick | G02B 30/54 353/7 |
| 2016/0094797 | A1* | 3/2016 | Yoon | H04N 5/275 348/294 |
| 2016/0327849 | A1* | 11/2016 | Hietala | H04N 5/275 |
| 2017/0221227 | A1* | 8/2017 | Ishikawa | G06T 7/90 |
| 2017/0263139 | A1* | 9/2017 | Deng | G06K 9/4661 |
| 2017/0289516 | A1* | 10/2017 | Svortdal | G06T 3/00 |
| 2018/0035096 | A1* | 2/2018 | Gemayel | H04N 13/261 |
| 2018/0104106 | A1* | 4/2018 | Lee | G06T 1/0007 |
| 2018/0122144 | A1* | 5/2018 | Hubo | H04N 5/33 |
| 2019/0096125 | A1* | 3/2019 | Schulter | G05D 1/0088 |
| 2020/0042263 | A1* | 2/2020 | Iyer | G06F 3/147 |

* cited by examiner

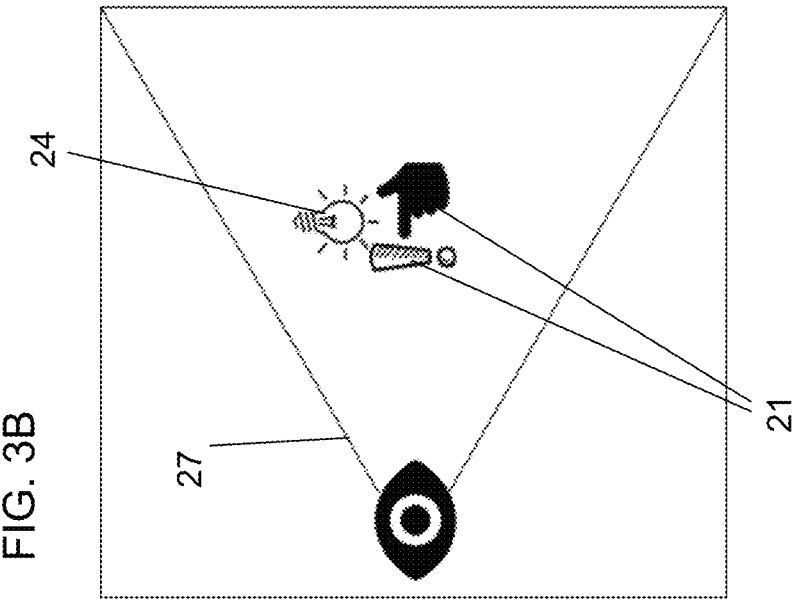
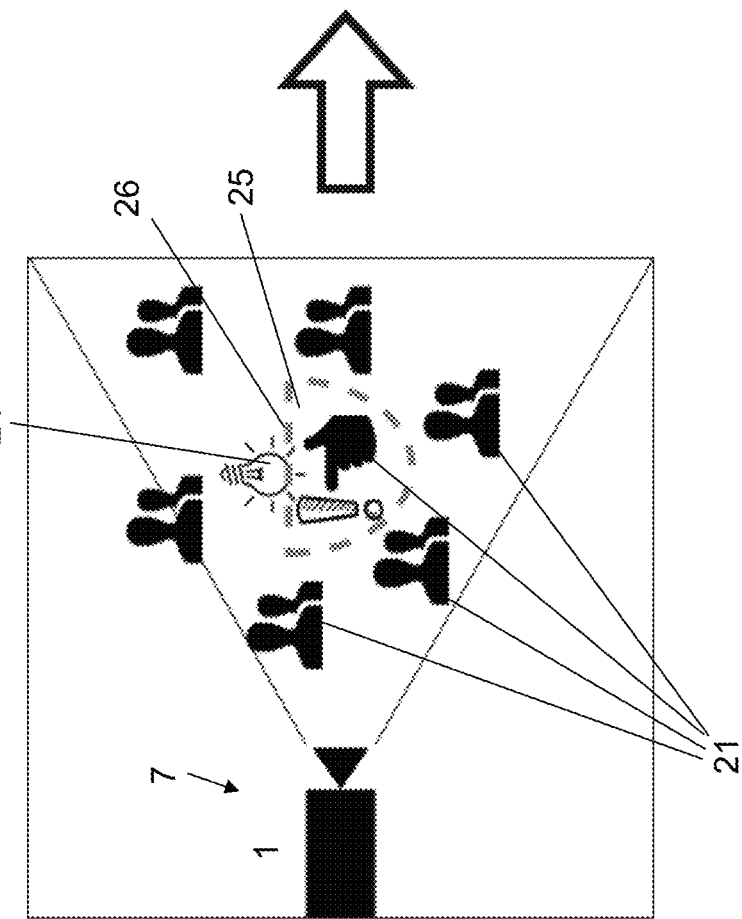

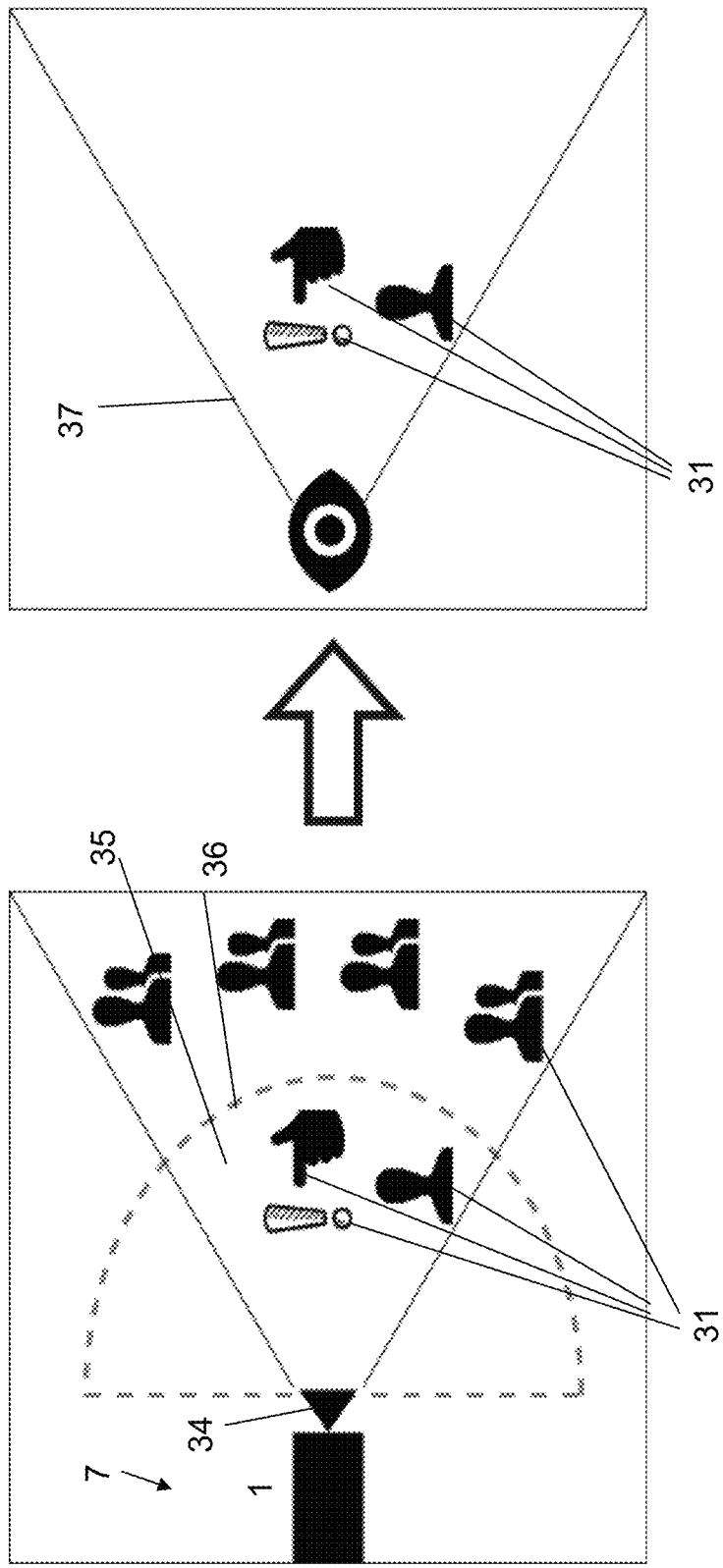

COMPUTER-IMPLEMENTED METHOD AND SYSTEM OF AUGMENTING A VIDEO STREAM OF AN ENVIRONMENT

This application claims foreign priority to European Patent Application No. 19154514.4, filed 30 Jan. 2019, the specification of which is hereby incorporated herein by reference.

BACKGROUND OF THE INVENTION

Field of the Invention

At least one embodiment of the invention relates to a computer-implemented method and system of augmenting a video stream of an environment. At least one embodiment further relates to a computer program product configured for performing such method.

Description of the Related Art

Such methods and systems are employed, for example, in connection with so-called Point-of-View (POV) video recording systems. Generally, POV is used to record situations, e.g., for documentation, training, video-based image analysis, and communication. Typically, a POV video recording system comprises one or more cameras for capturing a video stream and a transmitting device for transmitting the video stream to a display device or to a storing device which may be on site, or remotely accessible, e.g. through the Internet. The camera may be part of, or coupled with, a mobile device or wearable device. For instance, a POV video stream, e.g. recorded or streamed from a mobile or wearable device, is used to record trainings, document features, communicate with remote persons, or is used for computer vision-based tasks such as feature, object, and/or gesture recognition.

When employing POV video recording, typically during recording and streaming the surrounding environment is constantly captured by the camera system depending on the parameters of the optical system. In industrial settings, for example, this may be critical as, for instance, in some applications workforce privacy and IP protection of the involved companies need to be considered. There may be, for example, privacy problems, since persons in the environment are captured although not subject to intended content, which may result in their privacy rights potentially violated. Another problem may be that intellectual property critical devices may be present in the environment (such as in a production line, in products, procedures, etc.), which are captured and are potentially accessible to unauthorized persons.

United States Patent Publication 20170289623 discloses augmenting of a video stream of an environment, in which the environment is containing a private entity to be augmented. Video of the environment is processed in accordance with an entity recognition process to identify the presence of at least part of an entity in the environment. It is determined whether the identified entity is to be augmented based on information relating to the identified entity and the private entity. Based on determining that the identified entity is to be augmented, the video stream is modified to replace at least a portion of the identified entity with a graphical element adapted to obscure the portion of the identified entity in the video stream. By modifying the video stream to obscure an entity, private or personal information in the environment may be prevented from being displayed to a viewer of the video stream.

U.S. Pat. No. 9,571,785 B2 discloses a system and method for fine-grained privacy control of image and video recordings, which uses a model-based approach to solve privacy issues. The method includes steps of: receiving a digital capture of a subject bound by privacy constraints; receiving information regarding the subject, the environment, and the privacy constraints; using the information to generate a model image of the subject within the environment; associating a disposition tag with an appearance of the subject in the model image; and comparing the model image with the digital capture to determine coordinates in the recording where a privacy control action, such as a blocking action, should be applied.

World Intellectual Property Organization Patent Publication 2013003635 A1 discloses an image processing to prevent access to private information in which a processing resource receives original image data by a surveillance system. The original image data captures at least private information and occurrence of activity in a monitored region. The processing resource applies one or more transforms to the original image data to produce transformed image data. Application of the one or more transforms sufficiently distorts portions of the original image data to remove the private information. The transformed image data includes the distorted portions to prevent access to the private information. However, the distorted portions of the video include sufficient image detail to discern occurrence of the activity in the retail environment.

A problem with such existing image and video stream processing systems may arise from the fact that they require the user to define in advance which elements of the environment are permitted to be viewed in the video stream or images, and accordingly may require numerous pre-settings by the user and computer resource intensive image recognition procedures for identifying the respective elements in the captured environment.

It would thus be beneficial to provide a computer-implemented method and system of augmenting a video stream of an environment, for example employed in a POV video recording system, which are relatively user-friendly to handle, and which require relatively low resource capabilities in preventing objects of an environment from being viewed in a video stream of the environment.

BRIEF SUMMARY OF THE INVENTION

According to an aspect of at least one embodiment of the invention, there is provided a computer-implemented method of augmenting a video stream of an environment comprising the following steps: receiving, by a processing device, a first video stream including a plurality of image frames of a real environment provided from at least one camera; processing, by the processing device, the plurality of image frames of the first video stream to define a spatial scope of image data within a respective one of the image frames, modifying, by the processing device, the plurality of image frames with frame-based modification information configured to obfuscate or delete or restrict at least a portion of a respective one of the image frames which is outside of the spatial scope of image data within the respective one of the image frames, and outputting, by the processing device, a second video stream based on the modified plurality of image frames with the frame-based modification information for transmission to a receiving device.

According to another aspect, there is provided a computer program product comprising software code sections that, when loaded into an internal memory of a processing device, cause the processing device to perform a method according to any one of the preceding claims. For example, the computer program product is, or is part of, a computer readable medium comprising such software code sections. The computer program product, or computer readable medium, respectively, in principle can be, or can be stored on, any computer code storage medium accessible by commonly known processing devices, such as microprocessors, e.g. volatile or non-volatile memories, e.g. movable, wearable, or hard-disks, or memories on a remote server, to name potential examples.

According to another aspect, there is provided a system for augmenting a video stream of an environment, comprising a processing device operatively coupled to a memory having instructions stored thereon that, when executed by the processing device, cause the processing device to: receive a first video stream including a plurality of image frames of a real environment provided from at least one camera, process the plurality of image frames of the first video stream to define a spatial scope of image data within a respective one of the image frames, modify the plurality of image frames with frame-based modification information configured to obfuscate or delete or restrict at least a portion of a respective one of the image frames which is outside of the spatial scope of image data within the respective one of the image frames, and output a second video stream based on the modified plurality of image frames with the frame-based modification information for transmission to a receiving device.

In a potential implementation, the processing device may be implemented in software or hardware, in discrete or distributed manner, in any appropriate processing device, such as in one or more microprocessors of a local device, e.g. of a POV video recording system, and/or of one or more server computers.

For example, in such system for augmenting a video stream of an environment, the at least one camera is part of a point-of-view (POV) video recording system, and the processing device is coupled with the at least one camera for receiving the first video stream from the at least one camera. For example, the processing device may be part of the at least one camera or may be separate, but independently therefrom may be part of such POV video recording system. Accordingly, the at least one camera and the processing device may be both part of, e.g. integrated in, such POV video recording system.

The proposed method and system modify the image frames of a real environment of the first video stream with frame-based modification information, such that at least a portion of a respective one of the image frames which is outside of the spatial scope of image data is obfuscated or deleted or restricted. For example, the spatial scope is an area or portion within a respective one of the image frames indicative of a three-dimensional space within the captured image, for example is indicative of respective pixels or pixel area of the image frame which cover a particular spatial area or portion in the depicted three-dimensional space of the captured image. The modified second video stream is based on, e.g. comprises the modified plurality of image frames with the frame-based modification information which is configured to be processed by the receiving device (e.g. display or storage device) to obfuscate, delete or restrict the respective portion, e.g. when displaying it on a display device and/or storing it in a storage device.

The spatial scope may be set such that, for instance, an entity, private or personal information which is captured in the first video stream and outside of the spatial scope in the environment may be prevented from being displayed or accessible to a viewer of the modified second video stream. Thus, the method and system do not need any elaborate user pre-settings and resource intensive object or image recognition procedures for identifying any allowable objects in the environment, thus are relatively user-friendly to handle, and require relatively low resource capabilities in preventing objects of an environment from being viewed in a video stream of the environment.

For example, the spatial scope of captured entities of the environment may be employed or determined, e.g., by utilizing spatial fencing, depth and distance filtering, and/or movement data. This provides the advantage that the processing device may receive video streams as input and process it with one or more augmenting procedures with the aim of reducing the generally captured content to the contents of a defined environment. This environment can be constrained, for example, by location, dedicated objects and markers, depth and distance information, and/or movement data.

Any aspects and embodiments described herein with respect to the method of augmenting a video stream of an environment can equally be employed in the system with the processing device configured appropriately (by software and/or hardware) to perform the respective steps.

According to an embodiment of the invention, modifying the plurality of image frames with frame-based modification information configured to obfuscate or delete or restrict at least a portion of a respective one of the image frames includes at least one or a combination of: deleting, blurring, replacing by other visual information, coarsening, and encrypting the at least a portion of the respective one of the image frames. For example, each image frame of the plurality of image frames may contain a binary description/annotation for a set of pixels to be displayed or obfuscated, or blurred, or replaced by other visual information, or coarsened, or encrypted.

According to a further embodiment, receiving and processing the plurality of image frames of the first video stream comprises receiving the first video stream with image frames capturing the environment which is annotated with markers for defining the spatial scope, and defining the spatial scope based on one or more of the markers captured in the respective image frame. For example, the environment is annotated with markers defining the spatial scope of video data to be transmitted to the receiving device. These markers captured by the camera in the video stream may be processed in the processing device and a spatial restriction, i.e. the spatial scope, for video transmission is calculated by the processing device based on one or more markers.

According to an embodiment, the method further comprises defining a set of markers for defining the spatial scope. The step of defining the spatial scope based on one or more of the markers captured in the respective image frames comprises defining the spatial scope only if the set of markers is captured in the respective image frame and within a boundary interconnecting the respective markers of the set of markers. Particularly, only if a complete set of defined markers is captured, video transmission to the receiving device is calculated for data within the boundary interconnecting the set of markers.

According to a further embodiment, defining the spatial scope based on one or more of the markers captured in the respective image frames comprises defining the spatial scope with a specific spatial layout based on one or more of the markers. For example, markers are used to define a specific spatial layout in the form of a convex border. For instance, only if at least two or three markers are captured, video transmission to the receiving device is calculated for data within the boundary.

For example, a specific spatial layout is defined by one or more of the markers as points of a closed polygon, or of a convex border. Particularly, a specific spatial layout may be defined by markers as points of a closed polygon, whereby each marker is uniquely identifiable and the relative position in space is decodable. Video transmission of data to the receiving device may be calculated for the partial polygon reconstructed from captured markers.

According to a further embodiment, processing the plurality of image frames of the first video stream comprises defining the spatial scope based on one or more modulated light emitting elements captured in a respective one of the image frames. Particularly, defining the spatial scope based on one or more modulated light emitting elements captured in a respective one of the image frames may comprise defining the spatial scope based on light of a certain modulation recognized from a respective one of the image frames. For example, modulated LEDs (light emitting diodes) are used to define spatial scopes for content transmission to the receiving device. Only if light of a certain modulation can be recognized by the camera or processing device, data is allowed or in the negative case not allowed to be transmitted. LEDs with specific signatures can be attached to devices of interest. If emitted light is captured, the transmission rule is executed.

According to a further embodiment, processing the plurality of image frames of the first video stream comprises defining the spatial scope based on depth information associated with at least one of the image frames when providing the first video stream, thus defining a visual depth from the at least one camera. Particularly, calibrated additional depth information may be used to restrict visual data to a defined visual depth, i.e., only visual data within a certain range is transmitted to the receiving device.

According to an embodiment, the depth information is provided from at least one depth sensor, stereo camera, and/or Depth-from-Motion differential images. However, other suitable systems and/or methods for providing depth information may also be possible.

According to a further embodiment, the depth information is provided based upon at least one 2D/3D model of an object registered in at least one of the image frames and tracked within the plurality of image frames, with the depth information derived from the at least one 2D/3D model and detection of the object in the respective image frame associated with the at least one 2D/3D model.

BRIEF DESCRIPTION OF THE DRAWINGS

The above and other aspects, features and advantages of the invention will be more apparent from the following more particular description thereof, presented in conjunction with the following drawings wherein:

FIG. 3A depicts a schematic illustration of a system for augmenting a video stream of an environment according to an embodiment, in which modulated light defines an area in which contents are supposed to be recorded.

FIG. 3B depicts a schematic view illustrating a result of a video stream recorded by the system according to FIG. 3A.

FIG. 4A depicts a schematic illustration of a system for augmenting a video stream of an environment according to an embodiment, in which a depth sensor restricts the area that is recorded.

FIG. 4B depicts a schematic view illustrating a result of a video stream recorded by the system according to FIG. 4A.

DETAILED DESCRIPTION OF THE INVENTION

In the following exemplary description numerous specific details are set forth in order to provide a more thorough understanding of embodiments of the invention. It will be apparent, however, to an artisan of ordinary skill that embodiments of the invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1B:
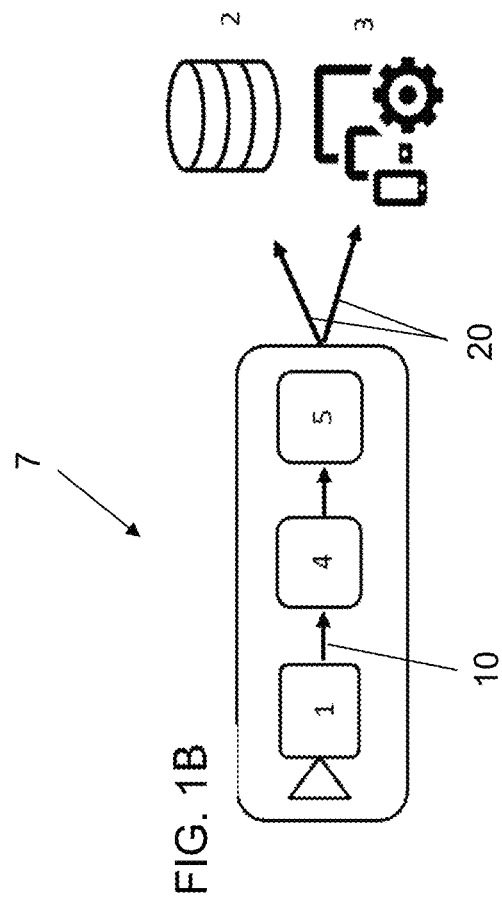
FIG. 1B depicts a schematic diagram illustrating a system for augmenting a video stream of an environment according to an embodiment of the invention.
Figure 1A:
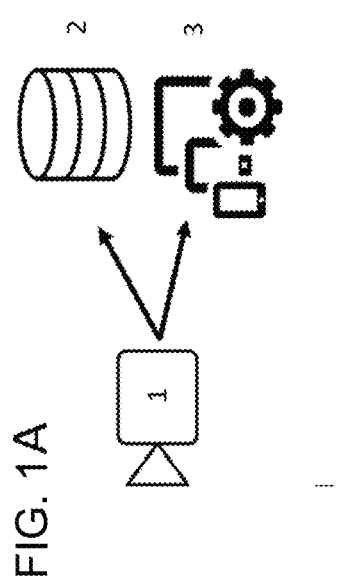
FIG. 1A depicts a schematic diagram illustrating an exemplary commonly known video recording system for directly transmitting a video stream to a file storage device or display device.

FIG. 1A shows a schematic diagram illustrating an exemplary commonly known video recording system for directly transmitting a video stream to a file storage device or display device. For example, the video recording system is or comprises a Point-of-View (POV) video recording system. For example, the system is used to record situations, e.g., for documentation, training, video-based image analysis, or communication. The video recording system comprises one or more cameras 1 for capturing a video stream of an environment (not explicitly shown) and transmitting the video stream to a display device 3 (which may be on site, or remote from the camera 1) or to a storing device 2 (which may also be on site, or remotely accessible, e.g. through the Internet). The camera 1 may be part of, or coupled with, a mobile device or wearable device. For instance, a POV video stream, e.g. recorded or streamed from a mobile or wearable device, is used to record trainings, document features, communicate with remote persons, or is used for computer vision-based tasks such as feature, object, and/or gesture recognition. The camera(s) may be any type of camera for capturing images or image streams of a real environment, such as one or more cameras used in commonly known mobile devices, such as smartphones, tablet computers, POV video recording systems, or head mounted devices used, e.g., in manufacturing or industrial environments, to name a few.

FIG. 1B shows a schematic diagram illustrating a system 7 for augmenting a video stream of an environment according to an embodiment of the invention. Like the system according to FIG. 1A, the system 7 of FIG. 1B comprises one or more cameras 1 for capturing a video stream 10 (herein referred to as first video stream), and in addition a processing device 4 for processing the video stream 10. The processing device 4 may be on site or remote from the at least one camera 1, e.g. coupled with the camera(s) in wired manner or wirelessly, for instance through the Internet. The processing device 4, which may comprise one or more microprocessors as commonly used in data processing devices like server computers or personal computers, receives the video stream 10 from the camera(s) 1. For example, the processing device 4 may be one or more microprocessors of a wearable device, which also comprises one or more cameras 1.

The video stream 10 includes a plurality of image frames of a real environment as commonly known, which in their sequence represent the video stream 10 of the real environment, e.g. an environment inside a manufacturing plant, in the form of moving images. As set out in more detail below, the processing device 4 processes the plurality of image frames of the video stream 10 to define a spatial scope of image data within a respective one of the image frames, and accordingly modifies the plurality of image frames with frame-based modification information.

The processing device 4 then outputs to an output unit 5 a video stream 20 (herein referred to as second video stream) based on the modified plurality of image frames with the frame-based modification information for transmission to one or more receiving devices 2 and/or 3. Particularly, the video stream 20 includes, or is formed by, the modified plurality of image frames with the frame-based modification information. For example, one of the receiving devices may be a storing device 2 for storing a file of the video stream, or a display device 3, such as a display device of a stationary device, a closed VR (virtual reality) glasses, or a mobile or wearable device, e.g. a semitransparent display device in the form of semitransparent data glasses. The storing device 2 and/or display device 3 may also be on site, e.g. coupled with the output unit 5 in wired manner or wirelessly, or remote from the processing device 4, for instance remotely accessible, e.g. through the Internet. For instance, the video stream 20 is used to record trainings, document features, communicate with remote persons, or is used for computer vision-based tasks such as feature, object, and/or gesture recognition.

According to aspects of the invention, the system 7 and method implemented in processing device 4 modify the image frames of the video stream 10 with frame-based modification information to form the modified video stream 20, such that at least a portion (e.g. pixels within a particular region) of a respective image frame of the video stream 20, which is outside of a spatial scope of image data, is obfuscated or deleted or restricted. The spatial scope, as explained in more detail below, may be set such that an entity, private or personal information which is present outside of the spatial scope in the environment may be prevented from being displayed to a viewer of the video stream 20, e.g. on display device 3.

Figure 5:
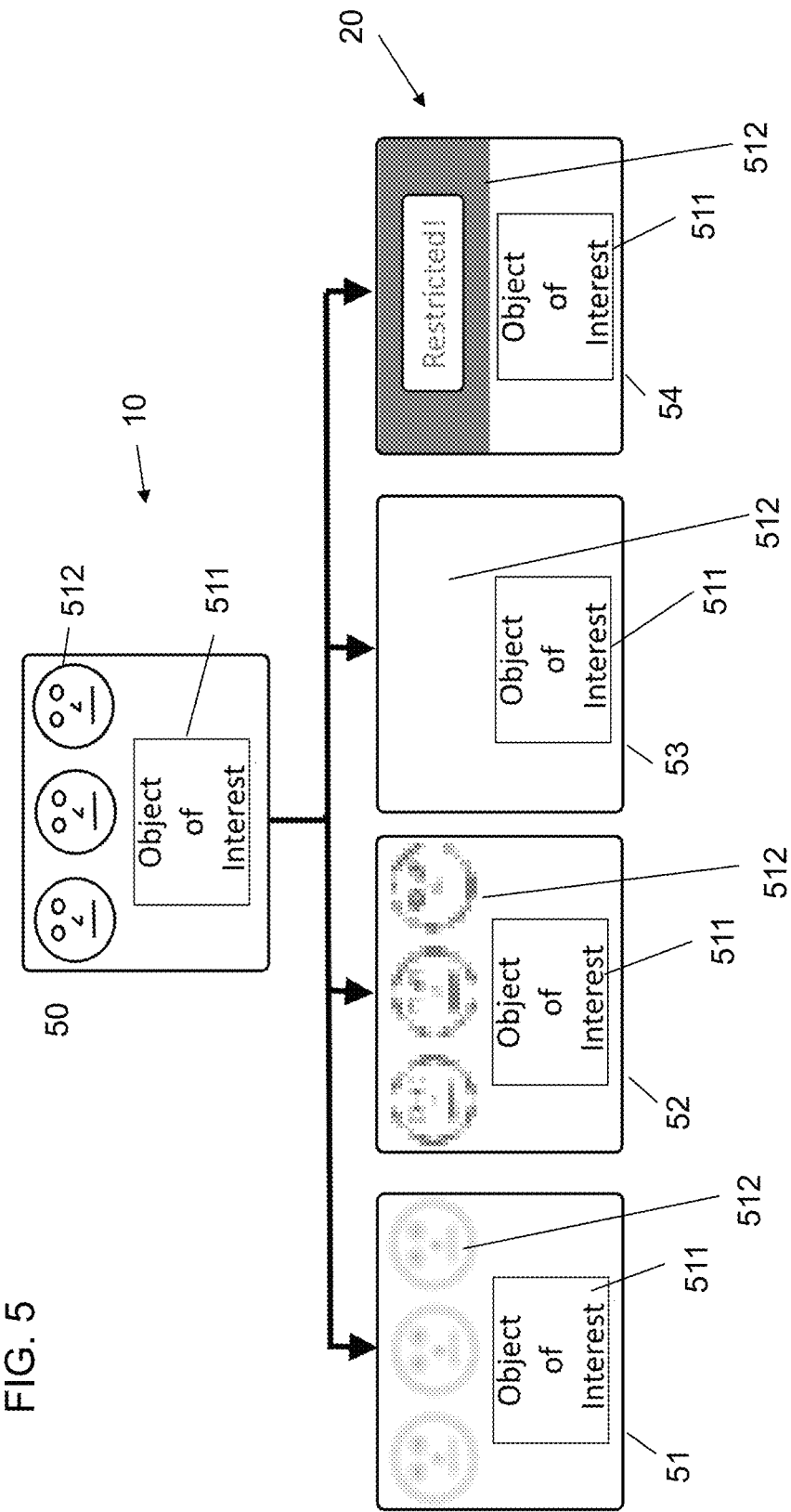
FIG. 5 shows examples of image frames of a video stream in which a portion, in particular image pixels of such portion, of a respective one of the image frames is obfuscated, deleted or restricted in accordance with frame-based modification information calculated according to an embodiment of the invention.

In this regard, FIG. 5 shows schematic examples of individual image frames 51, 52, 53, and 54 of a video stream 20 in which a portion 512, in particular image pixels of such portion 512, is obfuscated, deleted or restricted in accordance with frame-based modification information calculated by the processing device 4 according to an embodiment of the invention. The processing device 4 receives the video stream 10 from the camera(s) 1 which contains, e.g., a plurality of image frames 50 depicting an object of interest 511 (which can be undefined and is not required to be identified by an image recognition algorithm, or similar) and an entity, private or personal information, or similar, within a region 512. In the present example, the image frames 50 contain personal information, which shall not be recognizably displayed to the user.

According to examples of individual image frames 51 and 52 of a potential video stream 20 output by the processing device 4, the portion 512, in particular image pixels of portion 512, is obfuscated, for example blurred, replaced by other visual information (e.g., patterns, colors, etc.), or coarsened. According to the example of image frame 53 of a potential video stream 20 output by the processing device 4, the portion 512, in particular image pixels of portion 512, is deleted. According to the example of image frame 54 of a potential video stream 20 output by the processing device 4, the portion 512, in particular image pixels of portion 512, is restricted, e.g. encrypted. To this end if someone with the correct credentials watches the video stream 20, the portion 512 could be reconstructed so that access could be granted.

For example, the frame-based modification information (or frame-based restriction information) of each image frame calculated by the processing device 4 may contain a binary description/annotation for a set of pixels to be displayed or obfuscated, or deleted, or restricted. That is, each frame may contain such frame-based modification information in the form of a binary description/annotation for a set of pixels.

Figure 2B:
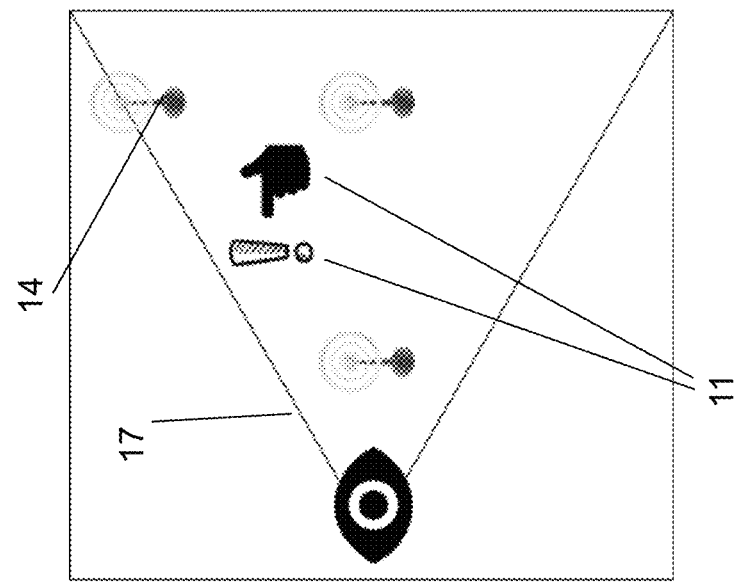
FIG. 2B depicts a schematic view illustrating a result of a video stream recorded by the system according to FIG. 2A.
Figure 2A:
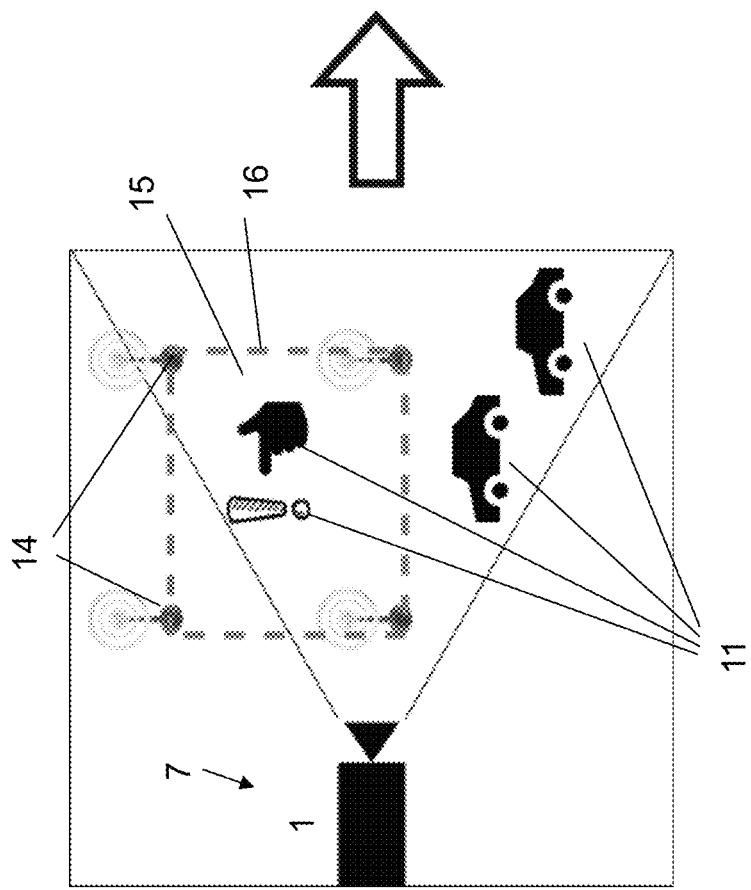
FIG. 2A depicts a schematic illustration of a system for augmenting a video stream of an environment according to an embodiment, in which markers define an area in which contents are supposed to be recorded.

FIG. 2A shows a schematic illustration of a system 7 for augmenting a video stream of an environment according to an embodiment, in which markers define an area in which contents are supposed to be recorded. FIG. 2B depicts a schematic view illustrating a result of a video stream recorded by the system according to FIG. 2A. In the depicted embodiment, markers define an area or portion in which admissible or desired contents of the respective image frames of video stream 10 are supposed to be recorded; only objects 11 within this area or portion are being shown within a field of view 17 in the video stream 20 output by the processing device 4.

In particular, the environment is annotated with markers defining a spatial scope of video data to be transmitted to the receiving device 2, 3. These markers are processed in the processing device 4 and a spatial restriction for video transmission is calculated. In the depicted illustration, the environment is annotated with markers 14 for defining the spatial scope 15 based on one or more of the markers 14 captured in the respective image frame. For example, a set of four markers 14 is defined for defining the spatial scope 15. In an embodiment, the spatial scope 15 is defined only if the set of four markers 14 is captured in the respective image frame and within a boundary 16 interconnecting the respective markers 14 of the set of four markers. In another embodiment, the spatial scope 15 is defined if at least some of the markers 14 are captured in the respective image frame and within a boundary 16 interconnecting the captured markers 14 of the set of four markers.

According to some embodiments, the processing device 4 may need to access information from an external source (not shown in the Figures), such as a server accessible through the Internet, to acknowledge and distinguish a configuration of markers. It is not necessary that all such information needed is (completely) stored locally.

Aspects of the invention may be implemented according to one or more of the following embodiments:

Complete Marker Visibility

Only if the complete set of defined markers 14 is captured in the respective image frame, video transmission to the receiving device 2, 3 is calculated or performed for image data within boundary 16 (here: bounding box) of the set of markers.

Partial Marker Visibility

Markers 14 are used to define a convex border (only contents with the hull are allowed to be transmitted to the receiving device 2, 3. Only if at least two or three of the markers 14 are captured, video transmission to the receiving device 2, 3 is calculated or performed for image data within boundary 16 (here: bounding box), if boundary 16 is of, e.g., rectangular or quadratic shape, or convex hull of set of markers 14.

Implicit Geometry Processing

A specific spatial layout is defined by markers 14 as points of a closed polygon, wherein each marker 14 is uniquely identifiable and the relative position in space is decodable. Video transmission of data to the receiving device 2, 3 is calculated for the partial polygon reconstructed from captured markers 14. The geometry can be processed from a visual scan of markers 14.

FIG. 3A depicts a schematic illustration of a system 7 for augmenting a video stream of an environment according to an embodiment, in which modulated light defines an area in which contents are supposed to be recorded, whereas FIG. 3B depicts a schematic view illustrating a result of a video stream recorded by the system according to FIG. 3A. In the disclosed embodiment, the spatial scope 25 of image data within the respective image frames is based on one or more modulated light emitting elements 24 captured in a respective one of the image frames. In particular, determination of the spatial scope 25 (here: defined by a boundary 26) is based on light of a certain modulation recognized from a respective image frame of the video stream 10. That is, according to aspects of the invention, modulated light defines an area or portion within each of the image frames of video stream 10 in which admissible or desired contents are supposed to be recorded; only objects 21 within this light's area or portion within a field of view 27 are being shown.

According to an embodiment, modulated light, e.g., modulated LEDs (light emitting diodes) are used to define a spatial scope for content transmission to receiving device 2, 3. Only if light of a certain modulation can be recognized by the at least one camera 1 (or processing device 4), image data of a respective image frame of image stream 10 is allowed or, in the negative case, not allowed to be transmitted. LEDs with specific signatures can be attached to devices of interest. If emitted light is captured, a respective transmission rule may be executed.

FIG. 4A depicts a schematic illustration of a system 7 for augmenting a video stream of an environment according to an embodiment, in which depth information, e.g. from a depth sensor, restricts the area that is recorded. FIG. 4B depicts a schematic view illustrating a result of a video stream recorded by the system according to FIG. 4A. For example, a depth sensor restricts the area or portion of a respective image frame that is recorded, wherein only objects 31 within a field of view 37 within a certain distance (defined by depth range 36) are being shown.

According to an embodiment, the spatial scope 35 is defined based on depth information (here: depth range 36) associated with at least one of the image frames when providing the first video stream 10. The depth information defines a visual depth from the at least one camera 1. In the present embodiment, the depth information may be provided from a depth sensor 34, e.g. fixedly associated with or installed on the camera 1, which measures a range of objects 31 within a field of view 37. A particular depth range 36 may be preset by the user or processing device 4 up to which captured objects 31 shall be contained in the video stream 20, whereas objects 31 outside this range shall be obfuscated, deleted, or restricted. The depth range 36 thus defines a visual depth from the camera 1 and accordingly a spatial scope 35, here from the lens of the camera 1 to the depth range 36.

According to embodiments, the depth information or range 36 is provided from the at least one depth sensor 34, a stereo camera, and/or from Depth-from-Motion differential images.

According to further embodiments, depth information (such as the depth range 36) may additionally, or alternatively, be provided based upon at least one 2D/3D model of an object (such as one of the objects 31) registered in at least one of the image frames and tracked within the plurality of image frames of video stream 10. The depth information may then be derived from the at least one 2D/3D model and detection of the object in the respective image frame associated with the at least one 2D/3D model.

According to an embodiment, calibrated additional depth information is used to restrict visual data to a defined visual depth, i.e., only visual data within a certain range is transmitted to the receiving device 2, 3.

In a first variant thereof, depth information of a dedicated image and depth sensor, e.g., of a commonly known RGB-D sensor, is used to restrict the area of visual data transmission to the receiving device 2, 3. Only the contents of the video stream 10 within a defined distance from the camera 1 are transmitted to the receiving device 2, 3. Distance is represented by depth values of the sensor. A RGB-D sensor is a specific type of depth sensing device that works in association with a RGB camera, that is able to augment a conventional image with depth information (related with the distance to the sensor), for example in a per-pixel basis.

In a further variant, depth information is additionally or alternatively generated by a stereo-camera to restrict the area of visual data transmission to receiving device 2, 3). Only contents of the video stream 10 within a defined distance from the camera 1 are transmitted to the receiving device 2, 3. For example, distance is represented by depth values of the sensor associated with (e.g. mounted on) the camera 1.

In a further variant, depth information is additionally or alternatively generated by so-called Depth-from-Motion. That is, differential images, e.g., taken at different time instances are used to calculate depth information for defining the spatial scope of image data for restriction, obfuscating, or deletion.

In a further variant, a model-based definition of the spatial scope may additionally or alternatively applied. For example, a 2D/3D model of an object is recognized and tracked. For example, a 2D/3D model of an object 31 may be used which is registered in the respective image frame according to the position of the object 31, so that a depth information may be generated for the object 31 from the 3D coordinates or dimensions of the model in three-dimensional space. Image information can then be obfuscated, deleted, or restricted based on the detection of the object 31. For example, the 2D/3D model can be obtained from CAD (computer aided design) data, video data, or blueprints known in the art.

According to an embodiment, a MARS sensor (magnetic-acoustic-resonator sensor) (inertial measurement unit, IMU, etc.) is used to track the camera 1 and to obfuscate or delete or restrict the area or portion of a respective one of the image frames which is outside of the spatial scope for transmission to the receiving device 2, 3. According to another embodiment, a MARS sensor is supported by visual input for obfuscating or deleting or restricting the information (like with SLAM, Simultaneous Localization and Mapping). Further embodiments include location-based obfuscating or deletion or restriction, e.g. by external positioning/fencing employing, e.g., GPS, WiFi (wireless LAN), Bluetooth®, UWB (ultra-wideband), IR (infra-red) and/or other sensors.

Thus, according to aspects of the invention, with the system and computer-implemented method as described herein, for example, a POV video recording may be employed, wherein during recording and streaming with the surrounding environment constantly captured by the camera system, critical content within the video stream, for instance with respect to privacy, production line, products, procedures, etc., may be restricted, deleted, or obfuscated, so that corresponding problems with such critical content may be taken account of. Advantageously, the system and method do not require any elaborate user pre-settings and resource intensive object or image recognition procedures for identifying any admissible or critical objects in the environment, thus are relatively user-friendly to handle, and require relatively low resource capabilities in preventing objects of an environment from being viewed in a video stream of the environment.

While the invention herein disclosed has been described by means of specific embodiments and applications thereof, numerous modifications and variations could be made thereto by those skilled in the art without departing from the scope of the invention set forth in the claims.

What is claimed is:

1. A computer-implemented method of augmenting a video stream of an environment, comprising:
    defining a spatial scope of image data based on one or more markers positioned in three-dimensional space of a real environment and that each correspond to a position in the three-dimensional space;
    receiving, by a processing device, a first video stream including a plurality of image frames of a real environment provided from at least one camera;
    processing, by the processing device, the plurality of image frames of the first video stream to define the spatial scope of image data within a respective one of the plurality of image frames,
        wherein said receiving said first video stream and said processing the plurality of image frames of the first video stream comprises
            receiving the first video stream with image frames capturing the environment which is annotated with the one or more markers to define the spatial scope, and defining the spatial scope based on at least one of the one or more markers captured in the respective one of the plurality of image frames;
    modifying, by the processing device, the plurality of image frames with frame-based modification information configured to obfuscate or delete or restrict at least one portion of a respective one of the plurality of image frames which is outside of the spatial scope of image data within the respective one of the plurality of image frames; and
    outputting, by the processing device, a second video stream based on a modified plurality of image frames with the frame-based modification information to transmit to a receiving device.

2. The method of claim 1, wherein said modifying the plurality of image frames with frame-based modification information configured to obfuscate or delete or restrict at least one portion of a respective one of the plurality of image frames comprises one or more of deleting, blurring, replacing by other visual information, coarsening, and encrypting the at least one portion of the respective one of the plurality of image frames.

3. The method of claim 1, further comprising defining a set of markers of the one or more markers to define the spatial scope, and defining the spatial scope based on at least one of the one or more markers captured in the respective one of the plurality of image frames comprises defining the spatial scope only if the set of markers is captured in the respective one of the plurality of image frames and within a boundary interconnecting respective markers of the set of markers.

4. The method of claim 1, wherein said defining the spatial scope based on at least one of the one or more markers captured in the respective one of the plurality of image frames comprises defining the spatial scope with a specific spatial layout based on at least one of the one or more markers.

5. The method of claim 4, wherein the specific spatial layout is defined by at least one of the one or more markers as points of a closed polygon, or of a convex border.

6. The method of claim 5, wherein each marker of said one or more markers is uniquely identifiable and a relative position in space of said each marker is decodable.

7. The method of claim 1, wherein said processing the plurality of image frames of the first video stream comprises defining the spatial scope based on one or more modulated light emitting elements captured in a respective one of the plurality of image frames.

8. The method of claim 7, wherein said defining the spatial scope based on one or more modulated light emitting elements captured in a respective one of the plurality of image frames comprises defining the spatial scope based on light of a certain modulation recognized from a respective one of the plurality of image frames.

9. The method of claim 1, wherein said processing the plurality of image frames of the first video stream comprises defining the spatial scope based on depth information associated with at least one of the plurality of image frames when providing the first video stream defining a visual depth from the at least one camera.

10. The method of claim 9, wherein the depth information is provided from one or more of at least one depth sensor, a stereo camera, and depth-from-motion differential images.

11. The method of claim 9, wherein the depth information is provided based upon at least one 2D/3D model of an object registered in at least one of the plurality of image frames and tracked within the plurality of image frames, with the depth information derived from the at least one 2D/3D model and detection of the object in the respective one of the plurality of image frames associated with the at least one 2D/3D model.

12. A computer program product comprising a non-transitory computer usable medium with software code sections that, when loaded into an internal memory of a processing device, cause the processing device to perform a method of augmenting a video stream of an environment, the method comprising the steps of
 defining a spatial scope of image data based on one or more markers positioned in three-dimensional space of a real environment and that each correspond to a position in the three-dimensional space;
 receiving, by the processing device, a first video stream including a plurality of image frames of a real environment provided from at least one camera;
 processing, by the processing device, the plurality of image frames of the first video stream to define the spatial scope of image data within a respective one of the plurality of image frames,
  wherein said receiving said first video stream and said processing the plurality of image frames of the first video stream comprises
   receiving the first video stream with image frames capturing the environment which is annotated with the one or more markers to define the spatial scope, and defining the spatial scope based on at least one of the one or more markers captured in the respective one fo the plurality of image frames;
 modifying, by the processing device, the plurality of image frames with frame-based modification information configured to obfuscate or delete or restrict at least one portion of a respective one of the plurality of image frames which is outside of the spatial scope of image data within the respective one of the plurality of image frames; and
 outputting, by the processing device, a second video stream based on a modified plurality of image frames with the frame-based modification information to transmit to a receiving device.

13. A system for augmenting a video stream of an environment, comprising:
 a processing device operatively coupled to a memory comprising instructions stored thereon that, when executed by the processing device, cause the processing device to:
  define a spatial scope of image data based on one or more markers positioned in three-dimensional space of a real environment and that each correspond to a position in the three-dimensional space;
  receive a first video stream including a plurality of image frames of a real environment provided from at least one camera;
  process the plurality of image frames of the first video stream to define the spatial scope of image data within a respective one of the plurality of image frames,
   wherein said receive said first video stream and said process the plurality of image frames of the first video stream comprises
    receive the first video stream with image frames capturing the environment which is annotated with the one or more markers to define the spatial scope, and define the spatial scope based on at least one of the one or more markers captured in the respective one of the plurality of image frames;
  modify the plurality of image frames with frame-based modification information configured to obfuscate or delete or restrict at least one portion of a respective one of the plurality of image frames which is outside of the spatial scope of image data within the respective one of the plurality of image frames; and
  output a second video stream based on a modified plurality of image frames with the frame-based modification information to transmit to a receiving device.

14. The system of claim 13, further comprising the receiving device which comprises at least one display device, wherein the processing device is coupled with the receiving device to display the second video stream on the at least one display device such that the at least one portion of a respective one of the plurality of image frames which is outside the spatial scope of image data is obfuscated or deleted or restricted.

* * * * *